United States Patent
Howard et al.

(10) Patent No.: US 10,140,742 B2
(45) Date of Patent: Nov. 27, 2018

(54) AUTOMATED GRAPHICAL USER-INTERFACE LAYOUT

(71) Applicant: Apple Inc., Cupertino, CA (US)

(72) Inventors: Joe R. Howard, San Jose, CA (US); Brian R. Frick, Gaithersburg, MD (US); Timothy B. Martin, Morgan Hill, CA (US); Christopher John Sanders, San Jose, CA (US)

(73) Assignee: APPLE INC., Cupertino, CA (US)

( * ) Notice: Subject to any disclaimer, the term of this patent is extended or adjusted under 35 U.S.C. 154(b) by 182 days.

(21) Appl. No.: 15/213,321

(22) Filed: Jul. 18, 2016

(65) Prior Publication Data

US 2016/0364893 A1 Dec. 15, 2016

Related U.S. Application Data

(63) Continuation of application No. 13/893,031, filed on May 13, 2013, now Pat. No. 9,397,844.
(Continued)

(51) Int. Cl.
*G09G 5/02* (2006.01)
*G06T 11/60* (2006.01)
(Continued)

(52) U.S. Cl.
CPC ............ *G06T 11/60* (2013.01); *G06F 3/0484* (2013.01); *G06F 9/451* (2018.02); *G09G 5/026* (2013.01); *G09G 5/377* (2013.01); *H04L 12/18* (2013.01); *G06F 3/04817* (2013.01); *G06T 2200/24* (2013.01); *G09G 2340/12* (2013.01); *H04L 67/10* (2013.01); *H04L 67/42* (2013.01)

(58) Field of Classification Search
CPC combination set(s) only.
See application file for complete search history.

(56) References Cited

U.S. PATENT DOCUMENTS 6,167,167 A * 12/2000 Matsugu .............. H04N 19/503
                                                                     358/538
6,711,291 B1     3/2004 Stubler et al.
(Continued)

FOREIGN PATENT DOCUMENTS

CN     101216765 A     7/2008
CN     101689177 A     3/2010
(Continued)

OTHER PUBLICATIONS

Cohen, et al., "Color Harmonization," Tel Aviv University, Jan. 1, 2006, 7 pages.
(Continued)

*Primary Examiner* — Hien L Duong
(74) *Attorney, Agent, or Firm* — Morgan, Lewis & Bockius LLP

(57) ABSTRACT

Embodiments of the present disclosure relate to automatic generation of dynamically changing layouts for a graphical user-interface. Specifically, embodiments of the present disclosure employ analysis of an image associated with the view (e.g., either the current view or a future view) of the graphical user-interface to determine colors that are complementary to the image. The colors are applied to the view, such that the color scheme of the view matches the image.

24 Claims, 7 Drawing Sheets

Related U.S. Application Data

(60) Provisional application No. 61/699,758, filed on Sep. 11, 2012.

(51) Int. Cl.
| | | |
|---|---|---|
| *H04L 12/18* | (2006.01) | |
| *G06F 9/451* | (2018.01) | |
| *G06F 3/0484* | (2013.01) | |
| *G09G 5/377* | (2006.01) | |
| G06F 3/0481 | (2013.01) | |
| H04L 29/08 | (2006.01) | |
| H04L 29/06 | (2006.01) | |

(56) References Cited

U.S. PATENT DOCUMENTS

| | | |
|---|---|---|
| 6,809,741 B1 | 10/2004 | Bates et al. |
| 6,859,210 B2 | 2/2005 | Luo et al. |
| 7,320,109 B1 | 1/2008 | Zeevi et al. |
| 7,480,405 B2 | 1/2009 | Poynter |
| 7,788,579 B2 | 8/2010 | Berkner et al. |
| 7,958,119 B2 | 6/2011 | Eggink et al. |
| 8,050,496 B2 | 11/2011 | Pan et al. |
| 8,645,489 B1 | 2/2014 | Riggins et al. |
| 2002/0198909 A1 | 12/2002 | Huynh et al. |
| 2006/0259875 A1 | 11/2006 | Collins et al. |
| 2007/0036456 A1 | 2/2007 | Hooper |
| 2007/0168388 A1 | 7/2007 | Plastina et al. |
| 2007/0186241 A1 | 8/2007 | Sugimoto et al. |
| 2007/0256009 A1 | 11/2007 | Jung |
| 2008/0120501 A1 | 5/2008 | Jannink et al. |
| 2008/0177640 A1 | 7/2008 | Gokturk et al. |
| 2008/0189656 A1 | 8/2008 | Abanami et al. |
| 2008/0227440 A1 | 9/2008 | Settepalli |
| 2008/0307342 A1* | 12/2008 | Furches .............. G06T 11/00 715/764 |
| 2009/0049082 A1 | 2/2009 | Slaney et al. |
| 2009/0150388 A1 | 6/2009 | Roseman et al. |
| 2009/0263016 A1 | 10/2009 | Kuo |
| 2010/0042654 A1 | 2/2010 | Heller et al. |
| 2010/0061633 A1* | 3/2010 | Ma ...................... G06K 9/38 382/176 |
| 2010/0076983 A1 | 3/2010 | Gates et al. |
| 2010/0088605 A1 | 4/2010 | Livshin et al. |
| 2010/0092085 A1 | 4/2010 | Marchesotti |
| 2010/0185671 A1 | 7/2010 | Burba et al. |
| 2010/0246951 A1 | 9/2010 | Gobriel et al. |
| 2011/0072343 A1 | 3/2011 | Baciu |
| 2011/0074807 A1 | 3/2011 | Inada et al. |
| 2011/0216966 A1 | 9/2011 | Cok et al. |
| 2011/0234613 A1 | 9/2011 | Hanson et al. |
| 2011/0246939 A1 | 10/2011 | Kasahara et al. |
| 2011/0265035 A1 | 10/2011 | Lepage et al. |
| 2012/0027294 A1 | 2/2012 | Krolczyk et al. |
| 2012/0030005 A1 | 2/2012 | Gupta |
| 2012/0036139 A1 | 2/2012 | Okamoto et al. |
| 2012/0054666 A1 | 3/2012 | Baird-Smith et al. |
| 2012/0072832 A1 | 3/2012 | Tanaka |
| 2012/0127198 A1 | 5/2012 | Gundavarapu |
| 2012/0143718 A1 | 6/2012 | Graham et al. |
| 2012/0299942 A1 | 11/2012 | Braun et al. |
| 2012/0313962 A1 | 12/2012 | Hsu et al. |
| 2012/0317123 A1 | 12/2012 | Green et al. |
| 2013/0044123 A1 | 2/2013 | Shah et al. |
| 2013/0057566 A1 | 3/2013 | Kriese et al. |
| 2013/0066819 A1 | 3/2013 | Nice et al. |
| 2013/0339907 A1 | 12/2013 | Matas et al. |
| 2014/0025619 A1 | 1/2014 | Michelstein et al. |
| 2014/0075313 A1 | 3/2014 | Bachman et al. |
| 2014/0075314 A1 | 3/2014 | Bachman et al. |
| 2014/0075324 A1 | 3/2014 | Howard et al. |
| 2018/0189863 A1* | 7/2018 | Tapley ............ H04N 21/44016 |

FOREIGN PATENT DOCUMENTS

| | | |
|---|---|---|
| TW | 201135578 A | 10/2011 |
| WO | WO 2007119927 A1 | 10/2007 |
| WO | WO 2011109181 A1 | 9/2011 |

OTHER PUBLICATIONS

Conner, "Using iTunes 10," Feb. 2011, Que Publishing, 19 pages.
Dong, "Chameleon: Color Transformation on OLED Displays," Department of Electrical & Computer Engineering, Rice University, Houston TX, May 2012, 1 page.
Meier, "ACE: A Color Expert System for User Interface Design," Department of Comuper Science, Brown University, Jan. 3, 1988, 12 pages.
Tanner, "iTunes Guide, A beginners guide to the iTunes," the Maccast Lemon Productions, Dec. 14, 2006, 14 pages.
Office Action, dated Jun. 18, 2015, received in U.S. Appl. No. 13/893,031, 13 pages.
Notice of Allowance, dated Jan. 21, 2016, received in U.S. Appl. No. 13/893,031, 19 pages.
Notice of Allowance, dated Feb. 1, 2016, received in U.S. Appl. No. 13/893,031, 2 pages.
Office Action, dated Nov. 9, 2015, received in Australian Patent Application No. 2013316041, which corresponds with U.S. Appl. No. 13/893,031, 4 pages.
Office Action, dated May 25, 2015, received in Taiwanese Patent Application No. 102131693, which corresponds with U.S. Appl. No. 13/893,031, 8 pages.
Patent, dated May 21, 2016, received in Taiwanese Patent Application No. 102131693, which corresponds with U.S. Appl. No. 13/893,031, 3 pages.
Office Action, dated Jul. 2, 2015, received in U.S. Appl. No. 13/890,888, 19 pages.
Office Action, dated Apr. 9, 2015, received in U.S. Appl. No. 13/893,072, 31 pages.
Notice of Allowance, dated Aug. 21, 2015, received in U.S. Appl. No. 13/893,072, 7 pages.
International Search Report and Written Opinion, dated Jan. 2, 2014, received in International Patent Application No. PCT/US2013/054364, which corresponds with U.S. Appl. No. 13/893,031, 12 pages.
International Preliminary Report on Patentability, dated Mar. 17, 2015, received in International Patent Application No. PCT/US2013/054364, which corresponds with U.S. Appl. No. 13/893,031, 9 pages.
Office Action, dated Oct. 25, 2016, received in Australian Patent Application No. 2013316041, which corresponds with U.S. Appl. No. 13/893,031, 4 pages.
Office Action, dated Oct. 17, 2016, received in Chinese Patent Application No. 2013800516019, which corresponds with U.S. Appl. No. 13/893,031, 2 pages.
Office Action, dated Jun. 22, 2017, received in Chinese Patent Application No. 2013800516019, which corresponds with U.S. Appl. No. 13/893,031, 5 pages.

* cited by examiner

AUTOMATED GRAPHICAL USER-INTERFACE LAYOUT

RELATED APPLICATIONS

This application is a continuation of U.S. application Ser. No. 13/893,031, filed May 13, 2013, which claims priority to U.S. Provisional Patent Application No. 61/699,758, filed Sep. 11, 2012, all of which are herein incorporated by reference in their entireties.

TECHNICAL FIELD

The present disclosure relates generally to a graphical user-interface, and, more particularly, to automatically generating a layout of the graphical user-interface.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

As the prevalence of electronic devices has increased, content, such as movies, music, images, etc., has largely become available in a digital format, displayable by these electronic devices. Accordingly, digital content players for electronic devices have become very prevalent. Because of the popularity of these players, manufacturers of these content players oftentimes strive to enhance the user experience. Unfortunately, despite this focus, content players generally have a static layout (e.g., static color-scheme, background images, etc.) that does not change based upon content that the content player is displaying.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to devices and methods for dynamically altering a graphical user-interface layout based upon an icon representing a currently displayed portion of the graphical user-interface. In some embodiments, a digital content player may define layout parameters based upon cover art or another image associated with the currently displayed content. Accordingly, the layout of content player may be dynamically enhanced to compliment the currently displayed digital content.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present technique allows for the dynamic creation of a layout for a graphical user-interface based upon an icon associated with the current view of the graphical user-interface. For example, a content player, such as the iTunes® application, available from Apple Inc. of Cupertino, Calif., may be enabled to provide a dynamic layout based upon an icon, such as a user-supplied graphic or content cover art. The dynamic layout may include changes to the background image and/or color as well as text color based upon the icon.

Figure 1:
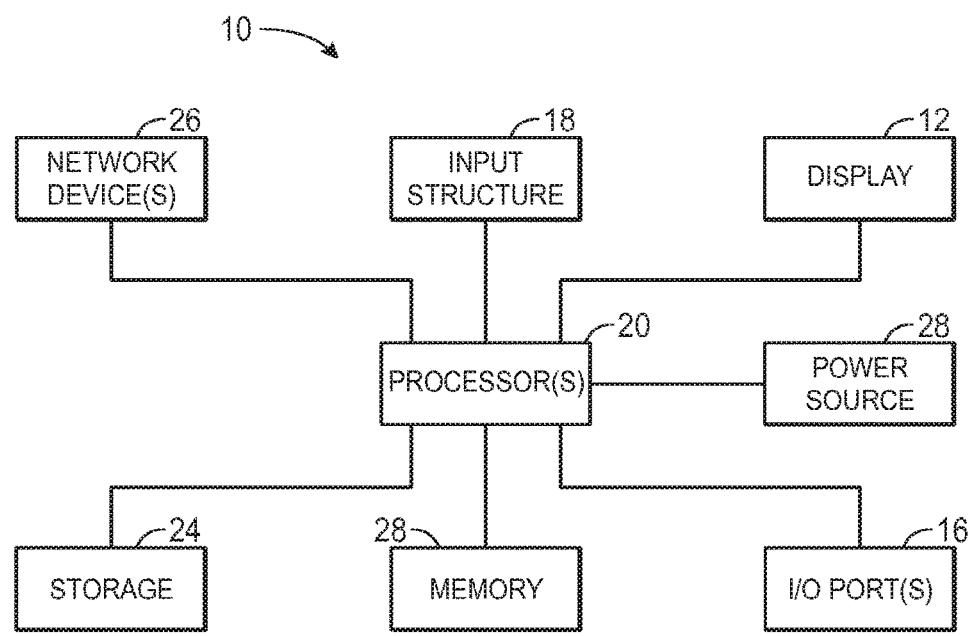
FIG. 1 is a block diagram of components of an electronic device, in accordance with an embodiment.
Figure 2:
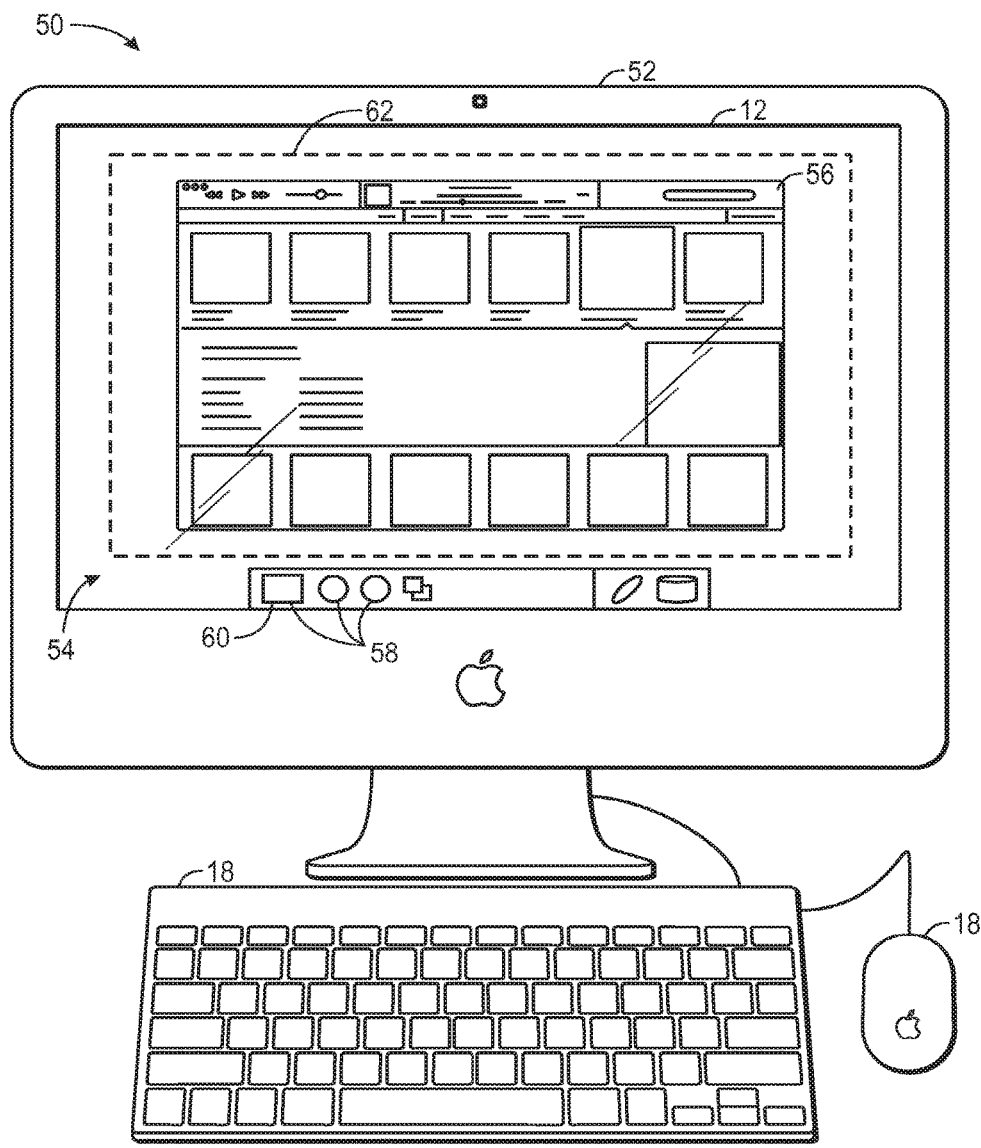
FIG. 2 is a schematic diagram of an example of an electronic device, in accordance with an embodiment.

With these foregoing features in mind, a general description of suitable electronic devices for implementing aspects of the present techniques are described below. In FIG. 1, a block diagram depicting various components that may be present in electronic devices suitable for use with the present techniques is provided. In FIG. 2, one example of a suitable electronic device, here provided as a desktop computer, is depicted. This type of electronic device, and other electronic devices providing comparable storage and/or processing capabilities, may be used in conjunction with the present techniques. For example, these and similar types of electronic devices may be used to display a dynamic layout graphical user-interface, in accordance with the teachings of the present disclosure.

An example of a suitable electronic device may include various internal and/or external components which contribute to the function of the device. FIG. 1 is a block diagram illustrating the components that may be present in such an electronic device 10 and which may allow the device 10 to function in accordance with the techniques discussed herein. The various functional blocks shown in FIG. 1 may comprise hardware elements (including circuitry), software elements (including computer code stored on a machine-readable medium) or a combination of both hardware and software elements. It should further be noted that FIG. 1 is merely one example of a particular implementation and is merely intended to illustrate the types of components that may be present in a device 10. For example, in the presently illustrated embodiment, these components may include a display 12, I/O ports 16, input structures 18, one or more processors 20, a memory device 22, a non-volatile storage 24, a networking device 26, and a power source 28.

With regard to each of these components, the display 12 may be used to display various images generated by the device 10. The display 12 may be any type of display such as a cathode ray tube (CRT), a liquid crystal display (LCD), a light emitting diode (LED) display, an organic light emitting diode (OLED) display, or other suitable display. Additionally, in certain embodiments of the electronic device 10, the display 12 may include a touch-sensitive element, such as a touch screen.

The I/O ports 16 may include ports configured to connect to a variety of external devices, such as a power source or other electronic devices (such as handheld devices and/or computers, printers, projectors, external displays, modems, docking stations, and so forth). The I/O ports 16 may support any interface type, such as a universal serial bus (USB) port, a video port, a serial connection port, a IEEE-1394 port, an Ethernet or modem port, and/or an AC/DC power connection port.

The input structures 18 may include the various devices, circuitry, and pathways by which user input or feedback is provided to the processor 20. Such input structures 18 may be configured to control a function of the device 10 when actuated. For example, the input structures 18 may include buttons, sliders, switches, control pads, keys, knobs, scroll wheels, keyboards, mice, touchpads, and so forth.

In certain embodiments, an input structure 18 and display 12 may be provided together, such as in the case of a touchscreen where a touch sensitive mechanism is provided in conjunction with the display 12. In such embodiments, the user may select or interact with displayed interface elements via the touch sensitive mechanism. In this way, the displayed user interface may provide interactive functionality, allowing a user to select, by touch screen or other input structure, from among options displayed on the display 12.

User interaction with the input structures 18, such as to interact with a user or application interface displayed on the display 12, may generate electrical signals indicative of the user input. These input signals may be routed via suitable pathways, such as an input hub or bus, to the processor(s) 20 for further processing.

The processor(s) 20 may provide the processing capability to execute the operating system, programs, user or application interfaces, and any other functions of the electronic device 10. The processor(s) 20 may include one or more microprocessors, such as one or more "general-purpose" microprocessors, one or more special-purpose microprocessors and/or ASICS, or some combination of such processing components. For example, the processor 20 may include one or more reduced instruction set (RISC) processors, as well as graphics processors, video processors, audio processors and/or related chip sets.

The instructions or data to be processed by the processor(s) 20 may be stored in a memory 22. The memory 22 may be provided as a volatile memory, such as random access memory (RAM), and/or as a non-volatile memory, such as read-only memory (ROM). The memory 22 may store a variety of information and may be used for various purposes. For example, the memory 22 may store firmware for the electronic device 10 (such as a basic input/output instruction or operating system instructions), other programs that enable various functions of the electronic device 10, user interface functions, processor functions, and may be used for buffering or caching during operation of the electronic device 10.

The components may further include a non-volatile storage 24 for persistent storage of data and/or instructions. The non-volatile storage 24 may include flash memory, a hard drive, or any other optical, magnetic, and/or solid-state storage media. The non-volatile storage 24 may be used to store data files such as personal information, software (e.g., an application used to play digital content on the electronic device 10 or on another electronic device), wireless connection information (e.g., information that may enable the electronic device 10 to establish a wireless connection, such as a telephone or wireless network connection), and any other suitable data.

The components depicted in FIG. 1 also include a network device 26, such as a network controller or a network interface card (NIC). In one embodiment, the network device 26 may be a wireless NIC providing wireless connectivity over any 802.11 standard or any other suitable wireless networking standard. The network device 26 may allow the electronic device 10 to communicate over a network, such as a Local Area Network (LAN), Wide Area Network (WAN), or the Internet. Further, the electronic device 10 may connect to and send or receive data with any device on the network, such as portable electronic devices, personal computers, printers, and so forth. Alternatively, in some embodiments, the electronic device 10 may not include a network device 26. In such an embodiment, a NIC may be added as an expansion card to provide similar networking capability as described above.

Further, the components may also include a power source 28. In one embodiment, the power source 28 may be one or more batteries, such as a lithium-ion polymer battery. The battery may be user-removable or may be secured within the housing of the electronic device 10, and may be rechargeable. Additionally, the power source 28 may include AC power, such as provided by an electrical outlet, and the electronic device 10 may be connected to the power source 28 via a power adapter. This power adapter may also be used to recharge one or more batteries if present.

FIG. 2 illustrates an electronic device 10 in the form of a desktop computer 50, such as an iMac® by Apple Inc., that may be used to generate and/or present a dynamic layout graphical user-interface. It should be noted that while the techniques will be described below in reference to illustrated electronic device 50 (which may be a desktop computer), the techniques described herein are usable with any electronic device employing a display. For example, other electronic devices may include a laptop computer, a tablet computer, a viewable media player, a mobile phone, a personal data organizer, a workstation, a standalone display, or the like. In certain embodiments, the electronic device may include a model of an iMac®, Mac® mini, Mac Pro®, MacBook®, a MacBook® Pro, MacBook Air®, Apple Cinema Display®, Apple Thunderbolt Display®, iPad®, iPod® or iPhone® available from Apple Inc. of Cupertino, Calif. In other embodiments, the electronic device may include other models and/or types of electronic devices, available from any manufacturer.

As illustrated in FIG. 2, the desktop computer 50 includes a housing 52 that supports and protects interior components, such as processors, circuitry, and controllers, among others, that may be used to generate images to display on display 12. Desktop computer 50 also includes user input structures 18, shown here as a keyboard and a mouse, that may be manipulated by a user to interact with desktop computer 50. For example, user input structures 18 may be employed to operate a graphical user interface (GUI) 54 of an operating system running on the desktop computer 50 as well as a GUI 56 of applications running on desktop computer 50. Input structures 18 may be connected to the electronic device 10 through a wired or wireless configuration. Further, in certain embodiments, electronic device 10 may include other types of user input structures, such as a touchscreen or trackpad, among others.

The GUI 54 may include various layers, windows, screens, templates, or other graphical elements that may be displayed in all, or a portion, of the display 12. Generally, the GUI 54 may include graphical elements 58 that represent applications and functions of the electronic device. The graphical elements 58 may include icons and other images representing buttons, sliders, menu bars, and the like. The icons may correspond to various applications of the electronic device that may open upon selection of a respective icon. Furthermore, selection of an icon may lead to a hierarchical navigation process, such that selection of an icon leads to a screen that includes one or more additional icons or other GUI elements 58. The icons may be selected via a touch screen included in the display 12, or may be selected by a user input structure 18, such as a wheel or button.

When an icon is selected, the desktop computer 50 may be configured to open an application associated with that icon and display a corresponding screen. For example, when the "iTunes" icon 60 is selected, the desktop pc 50 may be configured to open an application GUI 56 for the iTunes® application.

As discussed above the GUI 54 and/or the GUI 56 may include dynamic layout functionality that enables the GUI 54 and/or 56 to dynamically change the GUI layout based upon an icon that represents the current view of the GUI 54 and/or 56. For example, the processor 20 of the desktop computer 50 may be enabled to analyze album artwork or other images displayed in the GUI 56 to determine a complementary layout (e.g., a layout with a color scheme that at least partially matches the displayed image) and apply the complementary layout to the GUI 56. Similarly, the layout of the operating system GUI 54 may be dynamically altered based upon an analysis of the background image 62 displayed in the GUI 54.

Figure 3:
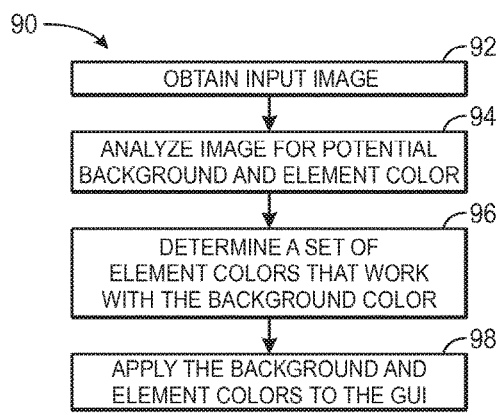
FIG. 3 is a flowchart describing a process for applying a dynamic layout, in accordance with an embodiment.

FIG. 3 illustrates a process 90 for applying a dynamic layout to a GUI based upon a graphical image displayed in the GUI. The process 90 may be executed by a computer, such as the computer 50 of FIG. 2. In some embodiments, a setting in the GUI may initiate the process 90. For example, the GUI may include an option to activate and/or deactivate dynamic layout adjustments. When activated, the process 90 may be implemented by the computer 50. When deactivated, the computer 50 may, at least partially, halt the process 90. For example, the computer 50 may halt the entire process 90 or may continue to determine complementary layouts for the different GUI views, but not apply the complementary views until the dynamic layout adjustments are re-activated.

Process 90 begins by obtaining an input image (block 92). The input image may be an image related to a user selection and/or the current view within the GUI. For example, in an iTunes® library, a user may select a particular piece of digital content, such as a movie, song, album, etc. In other cases, the user may select a genre, artist, or other page related to digital content. The iTunes® GUI may provide a view pertaining to the user's particular selection. In such cases, an image associated with the user's selection may be prominently displayed on the view. Because the image is prominently displayed, it may be desirable to coordinate the layout of the current view with the image. Accordingly, the input image may be the prominently displayed image of the current view.

Once the input image has been obtained, an analysis of the image is performed to determine potential background colors as well as colors for other elements of the GUI (block 94). For example, as will be described in more detail below with regards to FIG. 6, a computer may determine a background color as well as other dominant colors of the input image. Further these potential color choices may be further extended by developing additional colors through one or more modifications to characteristics of the potential color choices. For example, the translucence and/or brightness of a potential color choice may be modified to create an additional color that may be used in the GUI.

Once the background color is determined, the computer may determine a combination of the potential color choices that would be within acceptable parameters for a color scheme of the layout (block 96). For example, the computer may include instructions that describe optimal color combinations and/or color combinations to avoid. For example, the combination of certain red and blues may create a "push-in" or "pop-out" effect that is undesirable. The instruction may specifically avoid these effects by limiting the blue and red combinations that are acceptable color combination selections.

Further, the instructions may include characteristics useful for a desirable color scheme and/or characteristics that do not result in a desirable color scheme. For example, the instruction may provide that high-contrast colors create a desirable color scheme and/or that low-contrast colors result in an undesirable color scheme. Many different attributes may be included in instructions used for color selection. In some embodiments, the instructions may factor for multiple color attributes working in combination with one another. For example, the instructions may dictate that for high-contrast color selections, an increased amount of transparency may be allowed, while less transparency may be allowed when low-contrast colors are selected.

Once the color selections are made, the layout (e.g., the background color, the color selections, and/or a version of the input image) are applied to the GUI (block 98). For example, in some embodiments a single background color and two additional color selections are determined (e.g., a primary color selection and a secondary color selection). Based upon the computer's selections, the GUI layout may be altered. For example, higher prominence text may have the primary color selection applied, while less prominent text may have the secondary color applied. Additionally, in some embodiments, a tertiary color may also be generated based upon changing a color attribute of one of the color selections (e.g., modifying brightness, transparency, or other attribute of the color selection). This tertiary color may be used to provide an additional color choice for lower prominence text.

Figure 4:
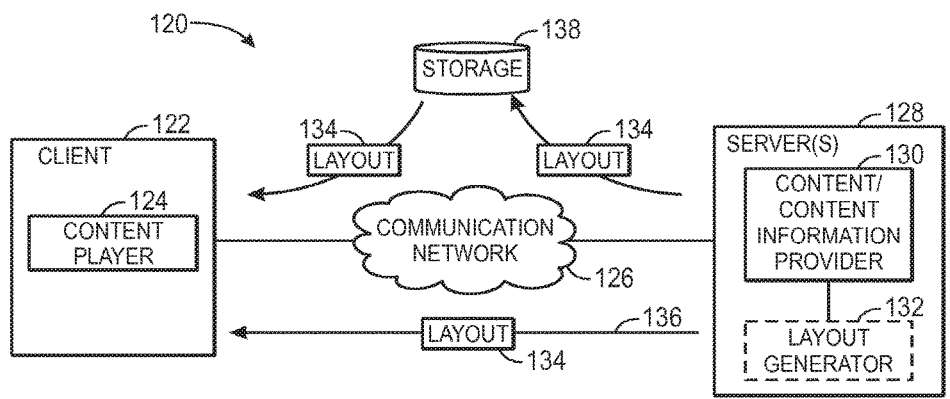
FIG. 4 illustrates a system where a server, external to the content player, generates a layout to be displayed by the content player, in accordance with an embodiment.
Figure 5:
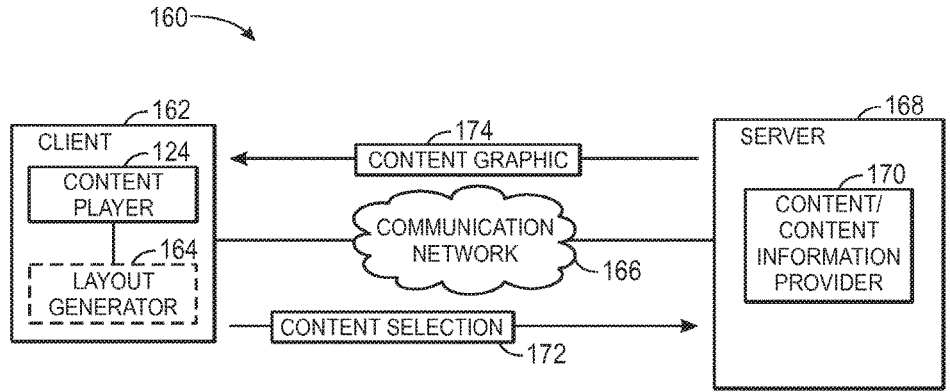
FIG. 5 illustrates a system where a client, hosting the content player, generates the layout, in accordance with an embodiment.

FIGS. 4 and 5 illustrate potential locations where the dynamic layout may be determined. In FIG. 4, the layout is generated external to a client computer hosting the content player and in FIG. 5 the layout is generated at the same client that hosts the content player. Starting first with FIG. 4, a digital content distribution system 120 is illustrated. The system 120 includes a client computer 122 that hosts a content player 124, such as iTunes®, that is enabled to apply a dynamic layout. In the illustrated embodiment, the client 122 is communicatively coupled via a communications network 126 (e.g., the Internet), to a content distribution server 128, such as the iTunes® store hosted by Apple Inc. The server 128 may include one or more services 130 to supply digital content and/or content information to the client 122. Further, the server 128 may include a service 132 that generates layouts for particular pieces of content and/or content information views, based upon image information obtained by the server 128. For example, for each piece of content and/or content information (e.g., album, song, artist, genre, etc.) that has an icon/image, the server 128 may attempt to generate a layout 134, according to the process 90 described in FIG. 3. The generated layout 134 may be associated with the digital content/content information and may be served directly to the client 122 (as illustrated by the arrow 136 or may be stored in cloud storage 138 (as illustrated by arrow 140) for retrieval by the client 122, either as a batch process (e.g., download multiple layouts at once) or as an instantaneous process (e.g., download the currently needed layout for the current view displayed in the content player 124).

Turning now to FIG. 5, a content distribution system 160 is provided. In the current embodiment, the client 162 hosts the content player 124 and also hosts a layout generation service 164 that is enabled to generate layouts based upon the current view of the content player 124 and/or the content stored in the content player 124.

The client 162 may be optionally connected, via a communications network 166 (e.g., the Internet), to a server 168 that hosts a service 170 for distributing digital content and/or digital content information (e.g., the iTunes® store). When connected to the server 168, the client may provide digital content and/or content information selections 172 to the server 168. In return, the server 168 may provide a content graphic 174, such as related album artwork, an artist's picture, a genre icon, etc. back to the client 162. Upon receiving the content graphic 174, the client may generate a layout using the content graphic 174.

In some embodiments, the server 168 may provide the content graphic 174 without receiving a particular content selection 172 from the user. For example, a list content and/or content information selections may be provided from the client 162 based upon content stored in the media player 124. Accordingly, the client may receive content graphics 174 for these pieces of digital content and/or content information and generate layouts in the background, such that they can be applied the next time the user selects a piece of content in the content player 124.

When offline (e.g., the client 162 is not connected to the server 168) and/or when an image is already associated with digital content and/or content information at the client 162, communications with server 168 may be unnecessary. Indeed, the pre-existing image may be used as the input image, enabling a dynamic layout to be generated without any interaction with the server 168.

The layouts derived by the layout generator may be cached, thus reducing a need to generate layouts every time a user selection changes. For example, results from the layout generator may be cached in the cloud storage and/or at the client 162 or server 168.

Figure 6:
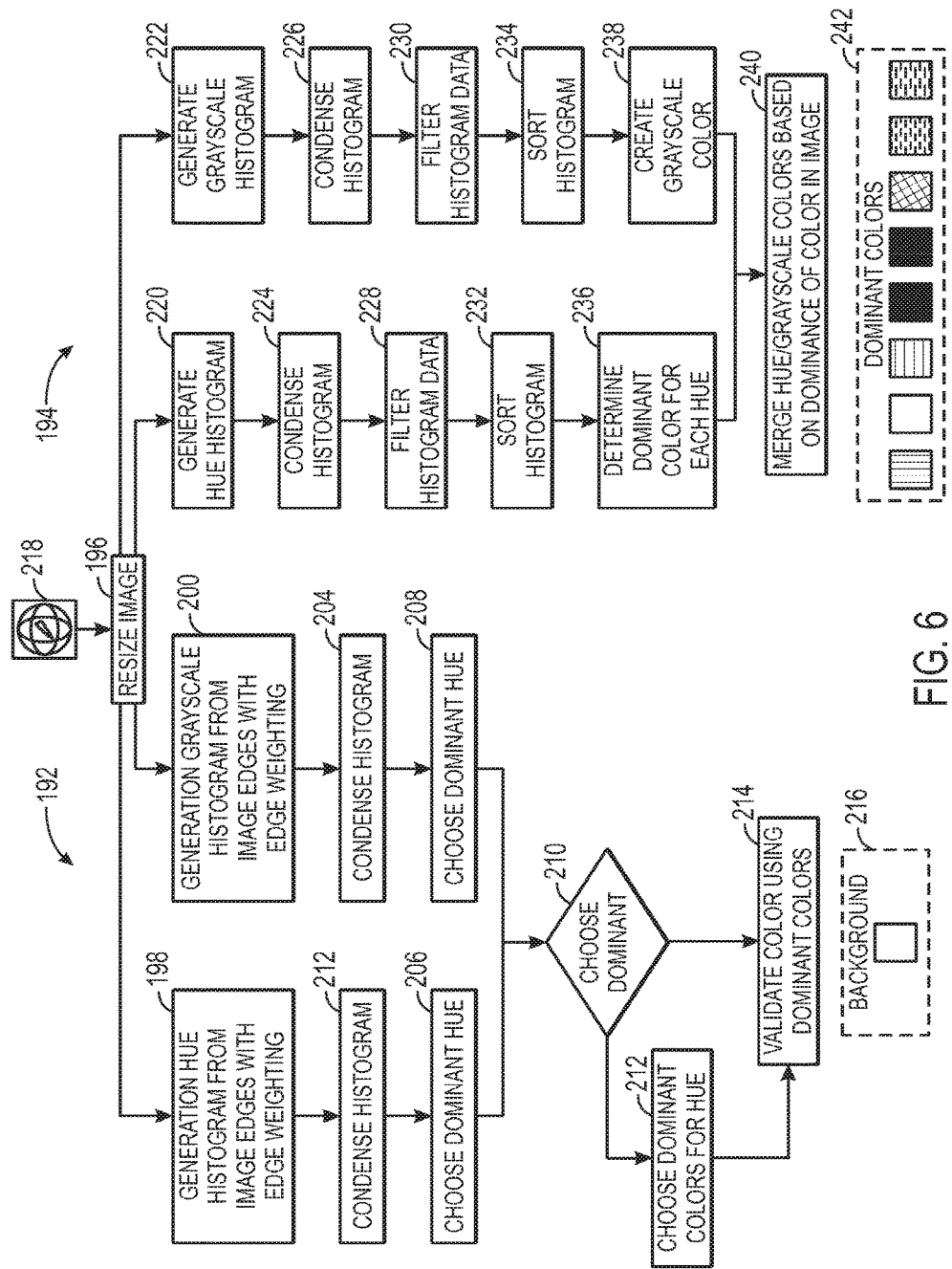
FIG. 6 illustrates a flowchart illustrating a process for determining background and dominant colors from an image associated with the digital content, in accordance with an embodiment.

Having generally discussed the process of applying a dynamic layout and where the input image may be provided from, the discussion now turns to a more detailed look at color selection based upon the input image. FIG. 6 is a flowchart 190 depicting processes 192 and 194 for determining a background color and dominant colors, respectively. To initiate the processes 192 and 194, the input image may be resized to a size that will be displayed in the GUI and/or a uniform size expected by the computer-implemented algorithm executing processes 192 and 194 (block 196).

After the input image is resized, the background color may be selected using process 192. First, hue and grayscale histograms from the input image edges are generating, taking into account edge weighting (blocks 198 and 200, respectively). The hue may describe a particular color's association with a defined color, while the grayscale may define a particular color's intensity. Depending on the position of the image within the GUI view, different portions (e.g., the edges and/or the center of the image) may be weighted differently, in terms of importance in determining colors. For example, edge weighting may be defined when the input image will be displayed on the upper-left corner of the GUI. For example, it may be more important to focus on the lower and right edges of the input image, as these edges may be closer to text or other layout elements that may be affected by dynamic layout changes based upon the input image. Further, as will be discussed in more detail below, the input image may be used as a background image that fades into the background color. Accordingly, the edges that are more centrally located in the background may be of more importance in determining a background color. In some embodiments, the center of an image may have a relatively high weight, especially when the image covers an entire portion of the GUI.

Once the hue and grayscale histograms are generated, the histograms are condensed, breaking the colors down into less granular color selections (blocks 202 and 204, respectively). Based upon the condensed hue and grayscale histograms, dominant hues and grayscales are selected (blocks 206 and 208, respectively). The dominant hue or grayscale is chosen (block 210). If the dominant hue is chosen instead of the grayscale value, the dominant color will be determined based upon the weighted hue histogram from block 206, otherwise the dominant color will be based on the dominant grayscale from block 208 (block 212). The color from block 212 or 206, based upon the determination from decision block 210, is validated and possibly overridden or modified (block 214). Thus, in the example provided in FIG. 6, the background color 216 is derived from the input image 218.

Turning now to a discussion of selecting the dominant colors, the dominant colors may be determined according to the process 194. As discussed above, the image is resized (block 196). Hue and grayscale histograms are generated based upon this resized image (blocks 220 and 222, respectively). The hue and grayscale histograms are condensed (blocks 224 and 226, respectively). Next, the condensed hue and grayscale histograms are filtered (blocks 228 and 230, respectively). The filter hue and grayscale histogram data is then sorted (blocks 232 and 234, respectively). Next, based upon the sorted histogram data, the dominant colors for each hue are determined (block 236) and a grayscale color is created (block 238). The hue and grayscale colors are then merged based on the dominance of color in the image (block 240), thus defining the dominant colors 242 of the input image 218.

Figure 7:
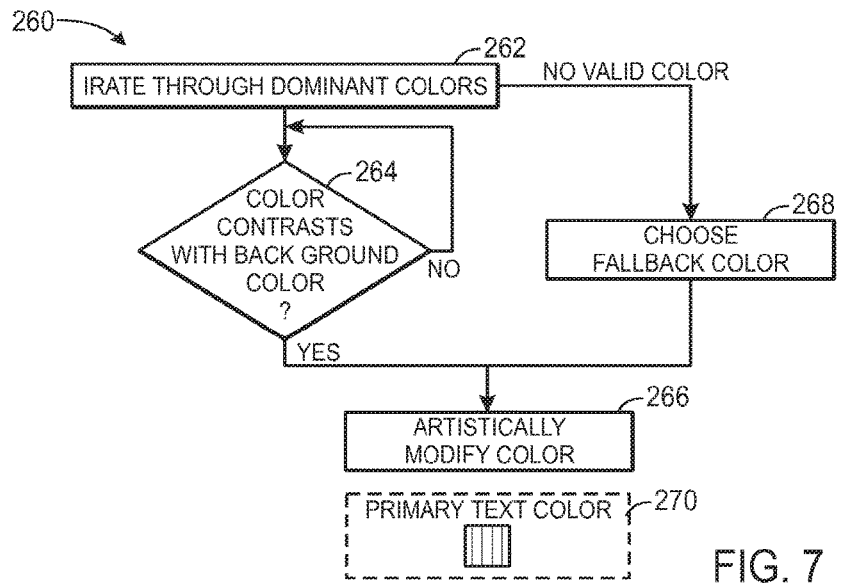
FIG. 7 illustrates a process for selecting a primary text color from the dominant colors of the process of FIG. 6, in accordance with an embodiment.
Figure 8:
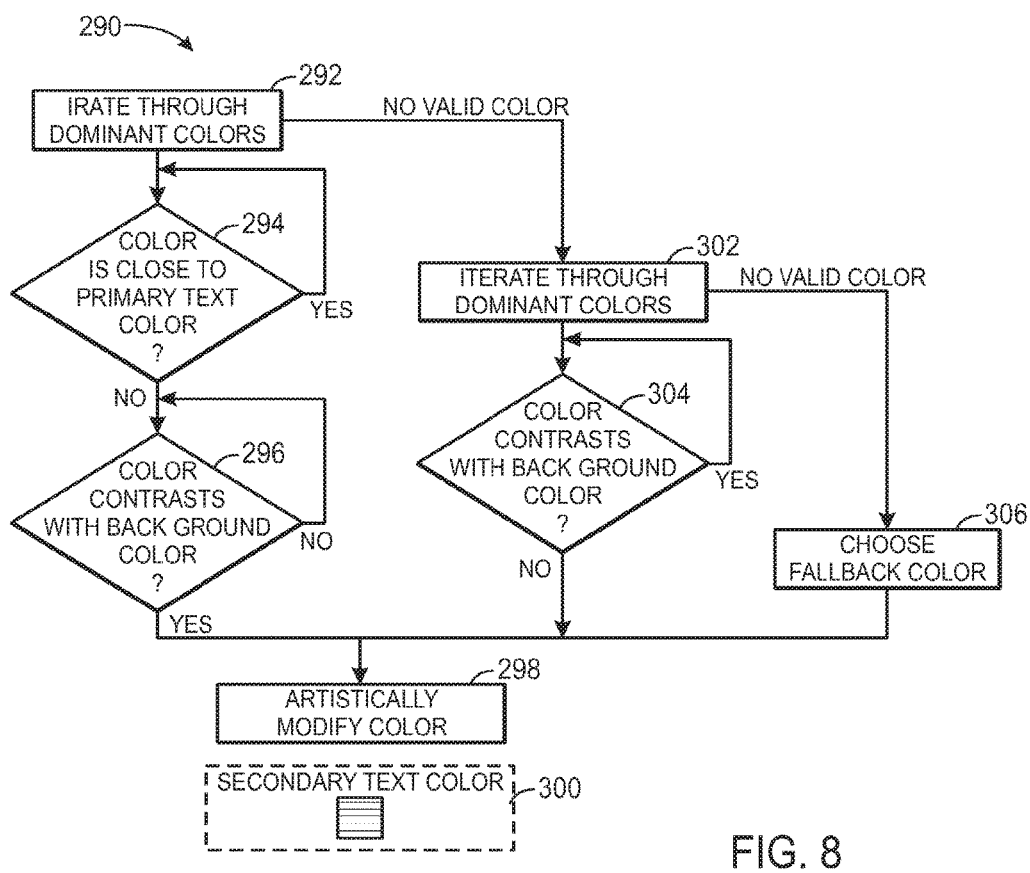
FIG. 8 illustrates a process for selecting a secondary text color from the dominant colors of the process of FIG. 6, in accordance with an embodiment.

Having now discussed the processes for determining background and dominant colors for a given input image, the discussion now turns to selecting layout colors from the dominant colors derived in the process 194. FIG. 7 illustrates a process 260 for determining a primary text color based upon the dominant colors derived from process 194 of FIG. 6. FIG. 8 illustrates a process 262 for determining a second text color based upon the dominant colors derived from process 194 of FIG. 6, where the second text color coordinates with the primary text color of FIG. 7.

The selection process 260 begins by iterating through the dominant colors of the input image (e.g., the dominant colors determined by process 194 of FIG. 6) (block 262). For each dominant color, the computer may determine whether the dominant color contrasts with the background color (decision block 264). If it does, the color is chosen and may be artistically modified to become an appropriate primary-text color (block 266). For example, the brightness, hue, intensity, etc. of the color may be altered based upon parameters defined by the algorithm implementing the process 260.

When a dominant color is determined not to contrast with the background, the next dominant color in the iteration is selected, and the process 260 is repeated. If, after iterating through all of the dominant colors, no contrasting colors are found, a fallback or default color selection is chosen (block 268). The fallback color may be artistically modified (block 266). For example, the brightness, hue, intensity, etc. of the color may be altered based upon certain parameters. After the dominant color or fallback color is artistically modified, the artistically modified color is set as the primary text color 270.

Process 290 of FIG. 8 may be used to select a secondary text color. The selection process 290 begins by iterating through the dominant colors of the input image (e.g., the dominant colors determined by process 194 of FIG. 6) (block 292). For each dominant color, the computer may determine whether the dominant color is close to the primary text color (decision block 294). If the dominant color is not close to the primary text color, the computer may determine whether the color contrasts with the background color (decision block 296). If the color does contrast with the background color, the dominant color may be artistically modified (block 298) and the artistically modified color may be selected as the secondary text color 300. For example, the brightness, hue, intensity, etc. of the color may be altered based upon parameters defining quality attributes of the color. If, however, the color is close to the primary text color or the color contrasts with the background color, the next dominant color in the iteration of dominant colors is selected, and the process 292 is repeated. If, after iterating through all the dominant colors, there is no valid color selection, the process may attempt a second pass at selecting a secondary text color, iterating through the dominant colors (block 302) to determine whether at least one of the colors contrasts with the background color (decision block 304). If one of the dominant colors does contrast with the background color, the selection may be artistically modified (block 298) and selected as the secondary text color 300. For example, the brightness, hue, intensity, etc. of the color may be altered based upon certain parameters defining quality attributes of a color. If there is no remaining dominant color that contrasts with the background, a fallback color may be chosen (block 306). The fallback color may be artistically modified (block 298) and may be selected as the secondary text color 300. For example, the brightness, hue, intensity, etc. of the color may be altered based upon parameters defining quality attributes of the color.

Figure 9:
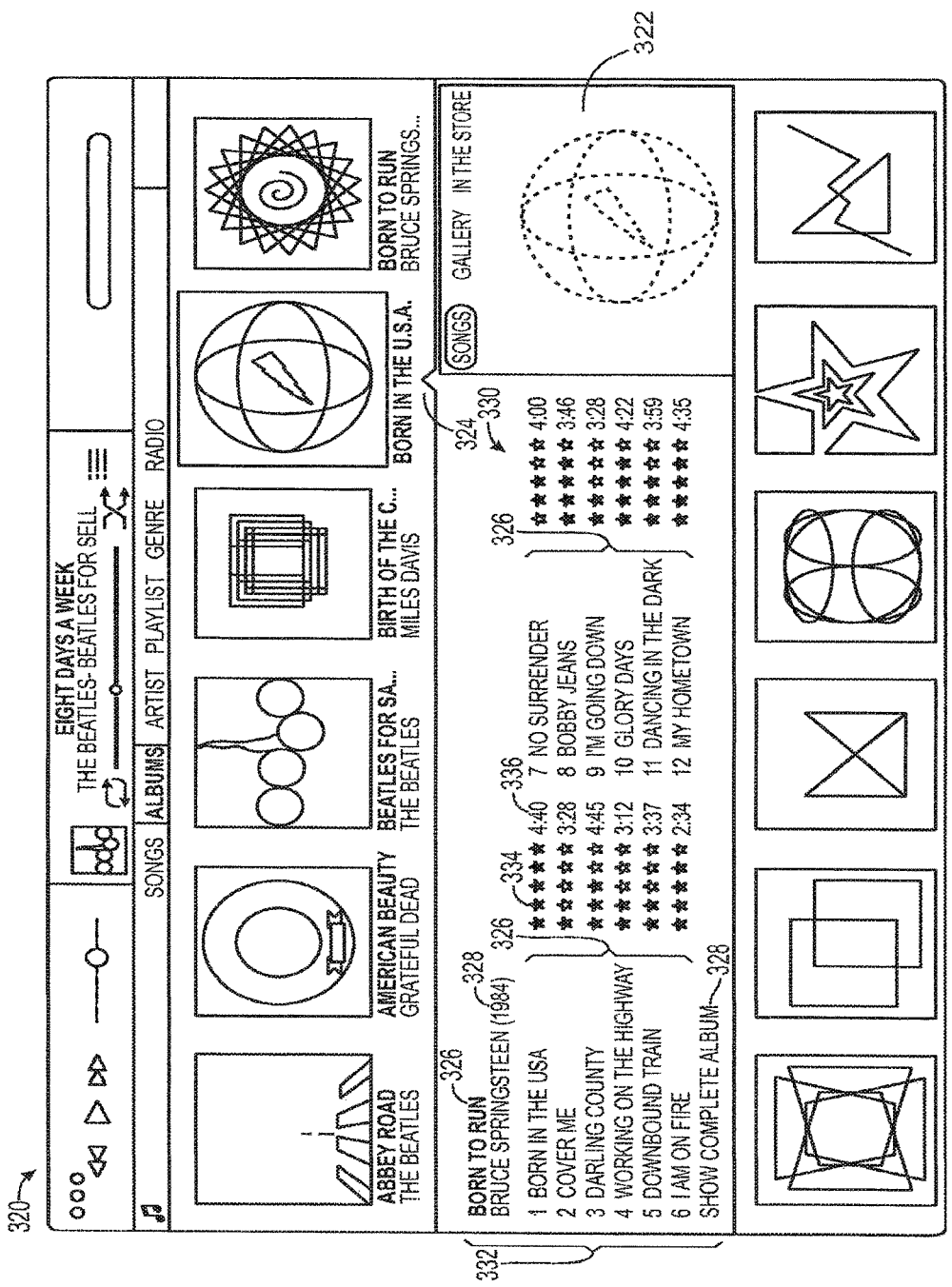
FIG. 9 illustrates an example of a content player graphical user-interface, using the colors determined in the processes of FIGS. 7 and 8, in accordance with an embodiment.

FIG. 9 illustrates the results of the process 90 of FIG. 3, which is described in more detail in processes 192, 194, 260 and 290 of FIGS. 6-8. FIG. 9 represents a GUI view 320 presented in the iTunes® application. As illustrated by the enlarged album icon 322 and the selector arrow 324, a user has selected an album in the Albums view of iTunes®. Based upon this selection, the layout generator may determine a primary text color and a secondary text color for use in the GUI layout. For example, based upon the album artwork (e.g., icon 322) the layout generator may determine that the background color should be #efefef, that the primary text color should be #921316, and that the secondary text color should be #1f274e. The colors have been applied to the primary text 326, secondary text 328, and background 330 of a portion of the GUI 332 describing specific elements of the selection (e.g. the album indicated by selector arrow 324) made by the user. In addition, as described above, the layout generator may add a sized version of the image 322 to the portion 332. As discussed above, image 322 may fade into the background 330, thus illustrating the importance of edge weighting the image when determining the background 330 color. Additionally, as described above, tertiary colors may also derived and used in the layout. For example the "ratings" stars 334 and/or the time length indicator 336 may use a version of the secondary color #1f274e that is of a different brightness, transparency or other altered characteristic.

While the provided example uses an album view in iTunes®, it is important to note that this example is not intended to limit the scope of implementation of the dynamic layout generator. For example, the layouts could be applied to movie views, TV episode views, artist information views, etc. Each of these views could use the colors defined in the layout in ways specific to the view. For example, album views with contributing artists could use a tertiary color to present the featured artist in a separate color. Additionally, TV episodes could be listed in the tertiary color, while the title and season are displayed in the primary and secondary colors, respectively. Further, implementation is not limited to iTunes® but could also be implemented in out applications with a GUI as well. For example, the above-described techniques could be used in applications such as OS X® or GarageBand®, by Apple, Inc.

Figure 10:
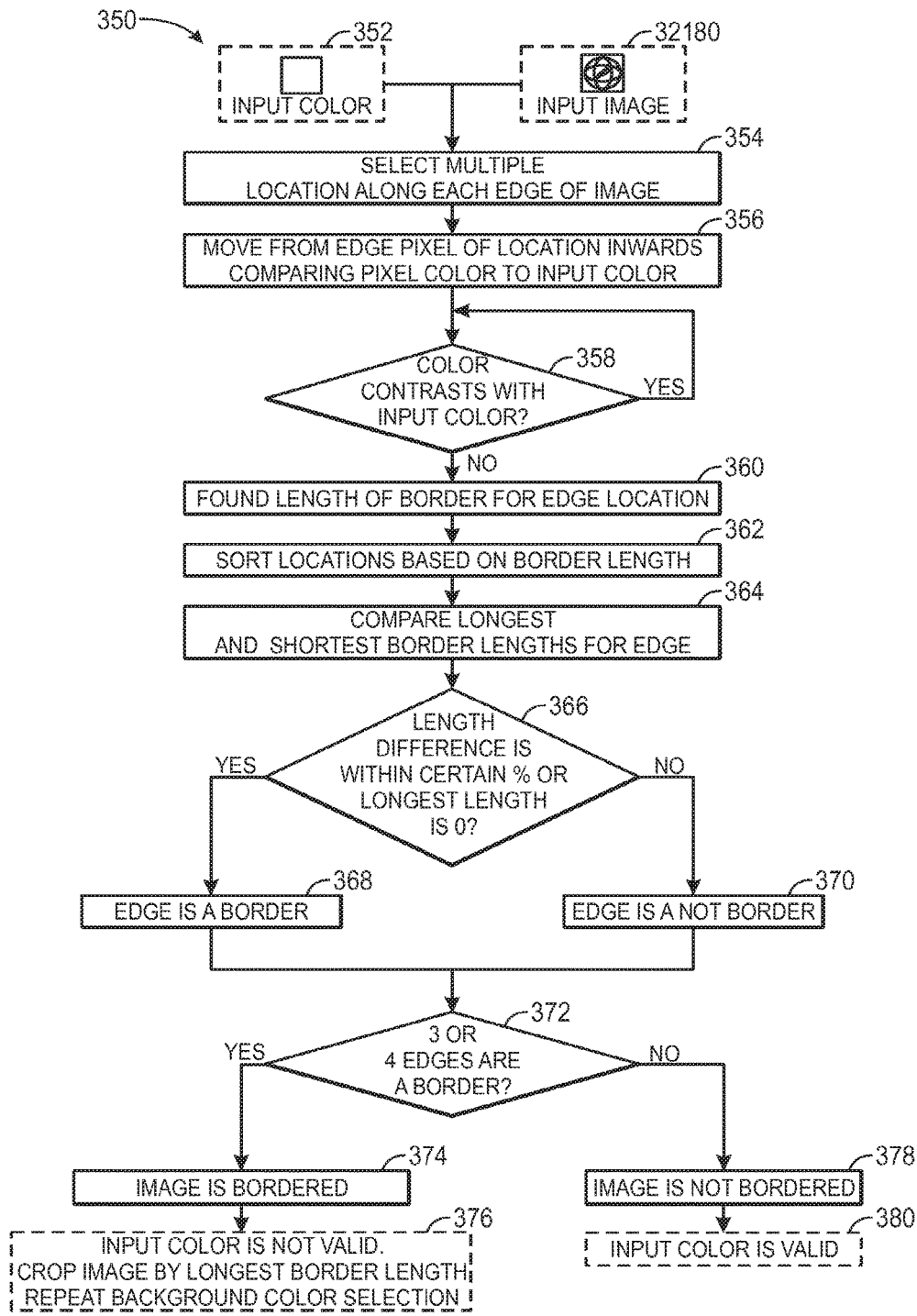
FIG. 10 is a flowchart illustrating a process for edge analysis of the input image, such that borders may be cropped, in accordance with an embodiment.

As the input image 218 may be blended into the background of a view of the GUI, it may be desirable to remove any borders present in the input image. FIG. 10 is a process 350 for cropping borders. The process 350 may occur during the background color validation of process 192 of FIG. 6 (block 214 of FIG. 6). The process 350 takes as inputs an input color 352 and the input image 218. Multiple locations along each edge of the input image 218 are selected (block 354). For each location, the pixel color is compared to the input color 352, moving from the edge pixels of the locations inward (block 356). Further, for each location, it is determined whether the pixel color contrasts with the input color (decision block 358). If not, the location is once again moved inward (block 356). If the color does contrast with the input color 352, the length of the border for each edge location is found (block 360). Once these steps have been repeated for each location, the locations are sorted based on the border length (block 362). The longest and shortest border lengths for an edge are compared (block 364). If the length difference is within a certain percentage or the longest length is zero (decision block 366), the edge is determined to be a border (block 368). Otherwise, the edge is determined not to be a border (block 370). Blocks 354-370 are repeated for each edge. Once each edge has been determined to be a border or not a border, a determination is made as to whether 3 or 4 edges are a border (decision block 372). If 3 or 4 edges are a border, the image is bordered (block 374). When the image is bordered, a determination may be made that the input color is not valid (e.g., because a border was present when the input color was determined), the image may be cropped by the longest border length, and the background color selection is repeated (block 376). When 3 or 4 edges are not a border, it may be determined that the image 218 is not bordered (block 378). Accordingly, the input color may be determined to be valid (block 380).

As may be appreciated, by implementing the techniques described herein, graphical user-interfaces used in electronic devices may be greatly enhanced. For example, the background colors and/or images as well as the text colors of the graphical user-interface may complement a graphical image currently displayed in the graphical user-interface. Through providing a complementary layout, the layout may be more appealing to the user, thus, creating an enhanced user experience.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method comprising:
   receiving a request to display information for a multimedia item, the multimedia item including an image;
   in response to receiving the request, displaying the image and additional information about the multimedia item, wherein:
   the additional information about the multimedia item is displayed overlaid on a background, the background having a first appearance that is generated based on one or more edges of the image, the first appearance including a background color; and
   at least a subset of the additional information is displayed with a second appearance that is generated based on the first appearance of the background and that is distinct from the first appearance.

2. The method of claim 1, wherein the second appearance is determined by modifying a translucence of at least a portion of the background.

3. The method of claim 2, wherein the additional information about the multimedia item includes information displayed with a third appearance that is different from the first appearance and the second appearance.

4. The method of claim 2, wherein the additional information about the multimedia item includes information about a plurality of media items associated with the image.

5. The method of claim 1, wherein the image is displayed adjacent to the additional information.

6. The method of claim 5, wherein the image fades into the background.

7. The method of claim 1, wherein the second appearance is generated based on the one or more edges of the image and the first appearance of the background.

8. The method of claim 1, wherein the first appearance of the background is based on weighted portions of the image in which one or more edges of the image are weighted differently from a center of the image.

9. A non-transitory computer-readable medium, comprising computer-readable instructions that when executed by a computer system cause the computer system to:
   receive a request to display information for a multimedia item, the multimedia item including an image;
   in response to receiving the request, generate a graphical user interface to display content, the graphical user-interface including the multimedia item and additional information about the multimedia item, and provide the graphical user interface for display, wherein:
   in the graphical user interface, the additional information about the multimedia item is overlaid on a background, the background having a first appearance that is generated based on one or more edges of the image, the first appearance including a background color; and
   in the graphical user interface, at least a subset of the additional information has a second appearance that is generated based on the first appearance of the background and that is distinct from the first appearance.

10. The non-transitory computer-readable medium of claim 9, wherein the second appearance is determined by modifying a translucence of at least a portion of the background.

11. The non-transitory computer-readable medium of claim 10, wherein the additional information about the multimedia item includes information displayed with a third appearance that is different from the first appearance and the second appearance.

12. The non-transitory computer-readable medium of claim 10, wherein the additional information about the multimedia item includes information about a plurality of media items associated with the image.

13. The non-transitory computer-readable medium of claim 9, wherein the image is displayed adjacent to the additional information.

14. The non-transitory computer-readable medium of claim 13, wherein the image fades into the background.

15. The non-transitory computer-readable medium of claim 9, wherein the second appearance is generated based on the one or more edges of the image and the first appearance of the background.

16. The non-transitory computer-readable medium of claim 9, wherein the first appearance of the background is based on weighted portions of the image in which one or more edges of the image are weighted differently from a center of the image.

17. A computer system, comprising:
   a processor configured to receive a request to display information for a multimedia item, the multimedia item including an image;
   the processor further configured to generate a graphical user interface to display content in response to receiving the request, the graphical user-interface including the multimedia item and additional information about the multimedia item, and to provide the graphical user interface for display, wherein:
   in the graphical user interface, the additional information about the multimedia item is overlaid on a background, the background having a first appearance that is generated based on one or more edges of the image, the first appearance including a background color; and in the graphical user interface, at least a subset of the additional information has a second appearance that is generated based on the first appearance of the background and that is distinct from the first appearance.

18. The computer system of claim 17, wherein the second appearance is determined by modifying a translucence of at least a portion of the background.

19. The computer system of claim 18, wherein the additional information about the multimedia item includes information displayed with a third appearance that is different from the first appearance and the second appearance.

20. The computer system of claim 18, wherein the additional information about the multimedia item includes information about a plurality of media items associated with the image.

21. The computer system of claim 17, wherein the image is displayed adjacent to the additional information.

22. The computer system of claim 21, wherein the image fades into the background.

23. The computer system of claim 17, wherein the second appearance is generated based on the one or more edges of the image and the first appearance of the background.

24. The computer system of claim 17, wherein the first appearance of the background is based on weighted portions of the image in which one or more edges of the image are weighted differently from a center of the image.

\* \* \* \* \*